United States Patent Office 3,417,082
Patented Dec. 17, 1968

3,417,082
NOVEL CHEMICAL COMPOUNDS
AND SYNTHESES
Lloyd D. Taylor, Everett, Mass., assignor to Polaroid Corporation, Cambridge, Mass., a corporation of Delaware
No Drawing. Filed Aug. 16, 1965, Ser. No. 480,160
6 Claims. (Cl. 260—240)

ABSTRACT OF THE DISCLOSURE

Novel compounds particularly adapted for employment as spectral radiation filtering agents are represented by the formula:

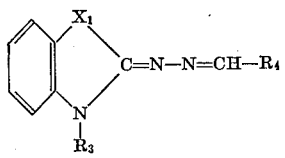

wherein $X_1$ is sulfur or selenium, $R_3$ is a lower alkyl group comprising from 1 to 5 carbon atoms; and $R_4$ is a mono-, bis-, or tri-lower alkoxy phenyl or naphthyl group.

---

This invention relates to chemistry and, more particularly, to novel chemical compounds and specified processes for the syntheses thereof.

A principal object of the present invention is to provide specified novel chemical compounds.

Another object of the present invention is to provide certain specified syntheses for preparing the novel compounds of the present invention.

Other objects of the invention will in part be obvious and will in part appear hereinafter.

The invention accordingly comprises the process involving the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description.

The present invention is concerned with compounds of the formula:

(I) 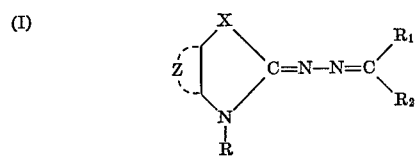

wherein X is sulphur, oxygen, selenium, or nitrogen atom; R is hydrogen, an alkyl group such as methyl, ethyl, n-propyl, isopropyl, n-butyl, isobutyl, allyl, β-methallyl, β-methoxyethyl, β-ethoxyethyl, hydroxymethyl, β-hydroethyl, β-hydroxypropyl, γ-hydroxypropyl, benzyl, β-phenethyl, carboxymethyl, α-carboxyethyl, β-carboxyethyl, γ-carboxypropyl, δ-carboxybutyl, γ-carboxybutyl, sulfomethyl, β-sulfoethyl, γ-sulfopropyl, γ-sulfobutyl, δ-sulfobutyl, p-sulfobenzyl, carboxymethoxymethyl, β-carboxymethoxyethyl, carbethoxymethyl, β-carbethoxyethyl, etc., or an aryl group such as phenyl, naphthyl, etc.; Z represents hydrogen or the nonmetallic atoms necessary to complete a heterocyclic ring system of the benzoselenazole, benzothiazole, benzoxazole, or benzimidazole series; $R_1$ is an aryl group such as a phenyl or naphthyl group; and $R_2$ is $R_1$ or hydrogen or an alkyl group such as those previously described.

The designated heterocyclic azole ring system and/or the aryl groups of the formula may additionally contain those substituents usual in the art, for example, substituents such as lower alkyl, lower alkoxy, benzyl, phenyl, naphthyl, chloro, bromo, iodo, fluoro, amino, quaternary ammonium, hydroxyl, cyano, nitro, carboxy, fused benzene ring, and the like.

Preferred compounds of Formula I comprise compounds of the formula:

(II) 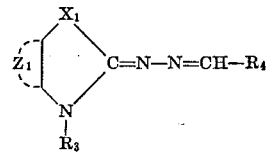

wherein $X_1$ is sulphur or selenium; $R_3$ is a lower alkyl group comprising from 1 to 5 carbon atoms; $R_4$ is a mono- or bis-alkoxyphenyl or naphthyl group or a dialkylaminophenyl group; and $Z_1$ represents the nonmetallic atoms necessary to complete a benzene ring.

As examples of compounds within Formula I, mention may be made of:

(1) 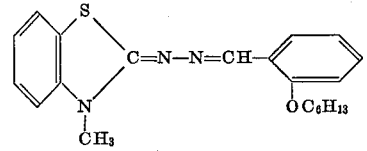

2-hexyloxybenzal-3'-methyl-2'-N-benzothiazoloazine (2) 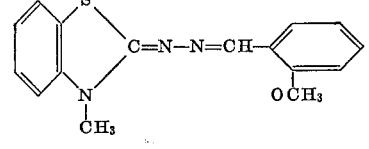

2-methoxybenzal-3'-methyl-2'-N-benzothiazoloazine (3) 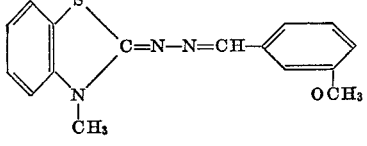

3-methoxybenzal-3'-methyl-2'-N-benzothiazoloazine (4) 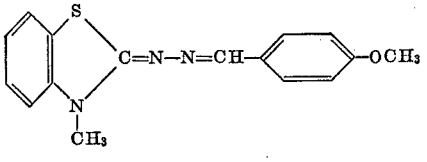

4-methoxybenzal-3'-methyl-2'-N-benzothiazoloazine (5) 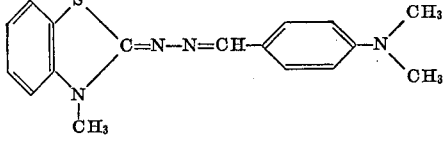

4-N,N-dimethylaminobenzal-3'-methyl-2'-N'-benzothiazoloazine (6) 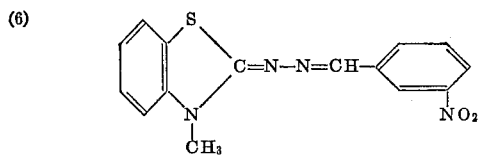
3-methyl-2-N-benzothiazolo-3'-nitrobenzalazine (7) 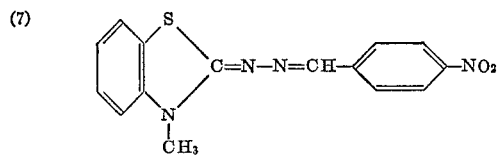
3-methyl-2-N-benzothiazolo-4'-nitrobenzalazine (8) 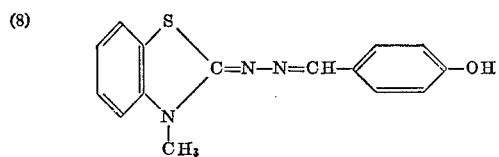
4-hydroxybenzal-3'-methyl-2'-N-benzothiazoloazine (9) 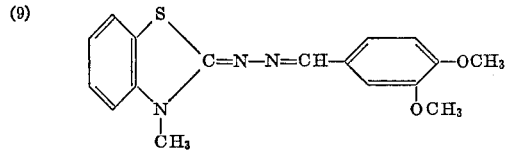
3,4-dimethoxybenzal-3'-methyl-2'-N-benzothiazoloazine

(10) 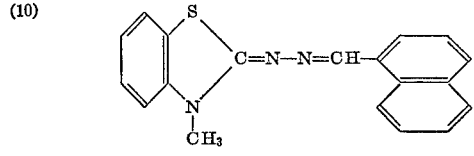
3-methyl-2-N-benzothiazolonaphthalazine

(11) 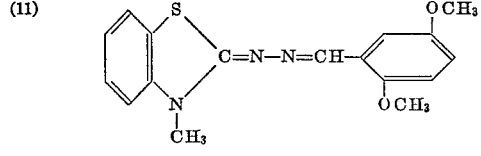
2,5-dimethoxybenzal-3'-methyl-2'-N-benzothiazoloazine

(12) 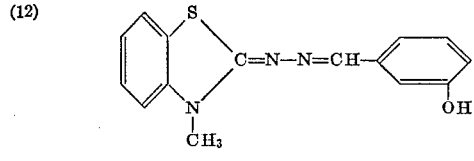
3-hydroxybenzal-3'-methyl-2'-N-benzothiazoloazine

(13) 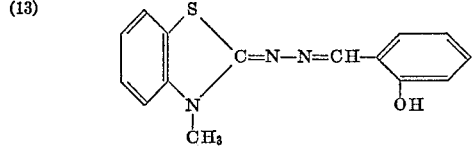
2-hydroxybenzal-3'-methyl-2'-N-benzothiazoloazine

(14) 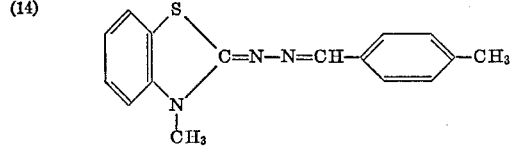
4-methylbenzal-3'-methyl-2'-N-benzothiazoloazine

(15) 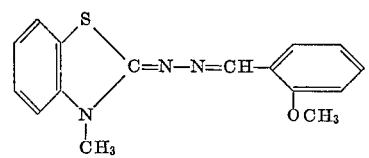
2,4-dimethoxybenzal-3'-methyl-2'-N-benzothiazoloazine

(16) 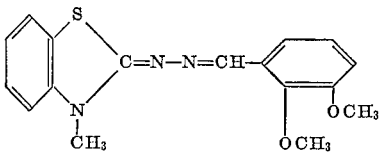
2,3-dimethoxybenzal-3'-methyl-2'-N-benzothiazoloazine

(17) 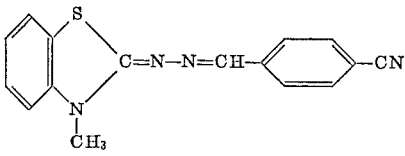
4-cyanobenzal-3'-methyl-2'-N-benzothiazoloazine

(18) 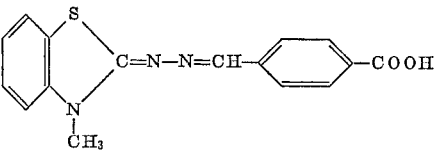
4-carboxybenzal-3'-methyl-2'-N-benzothiazoloazine

(19) 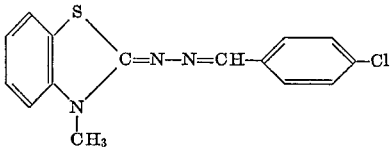
4-chlorobenzal-3'-methyl-2'-N-benzothiazoloazine

(20) 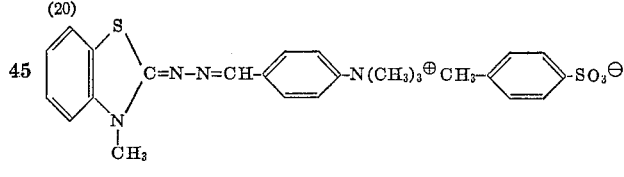
4-(trimethylammonium tosylate)-benzal-3'-methyl-2'-N-benzothiazoloazine

(21) 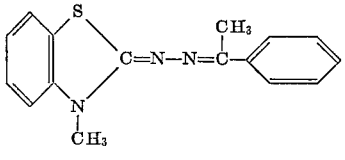
3-methyl-2-N-benzothiazolo-α-methylbenzalazine

(22) 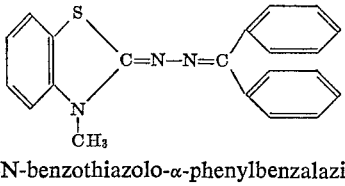
3-methyl-2-N-benzothiazolo-α-phenylbenzalazine

(23) 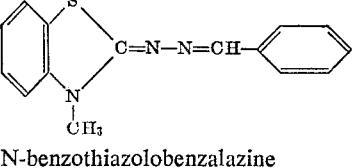
3-methyl-2-N-benzothiazolobenzalazine

(24) 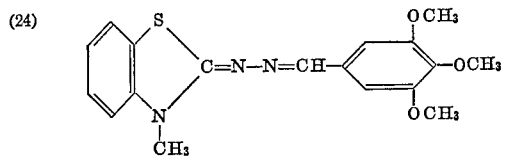

3,4,5-trimethoxybenzal-3′-methyl-2′-N-benzothiazolo-
azine

(25) 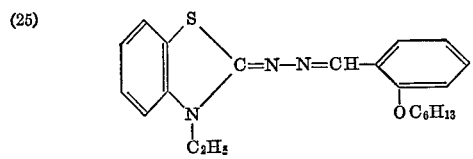

3-ethyl-2′-N-benzothiazolo-2′-hexyloxybenzalazine

(26) 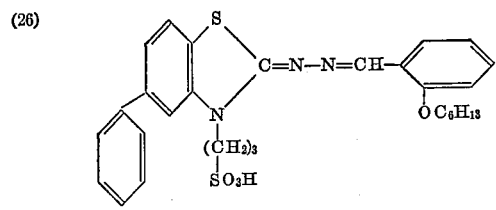

2-hexyloxybenzal-3′-(γ-sulfopropyl)-5′-phenyl-2′-N-
benzothiazoloazine

(27) 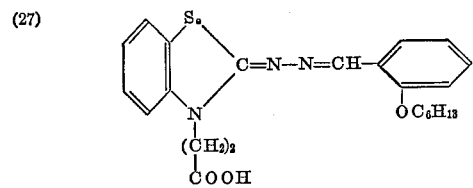

2-hexyloxybenzal-3′-(β-carboxyethyl)-2′-N-benzo-
selenazoloazine

(28) 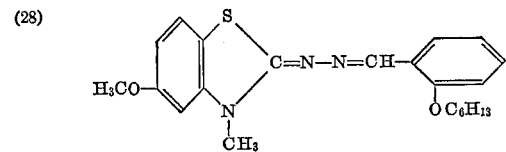

2-hexyloxybenzal-5′-methoxy-3′-methyl-2′-N-benzo-
thiazoloazine

(29) 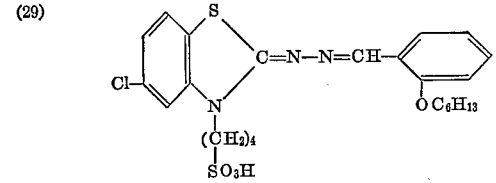

5-chloro-3-(δ-sulfobutyl)-2-N-benzothiazolo-2′-
hexyloxy-benzalazine

(30) 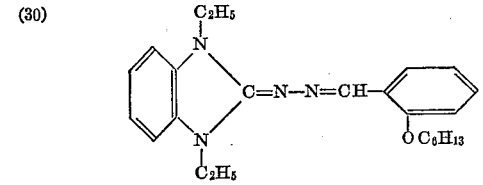

1,3-diethyl-2-N-benzimidazolo-6′-hexyloxybenzalazine

(31) 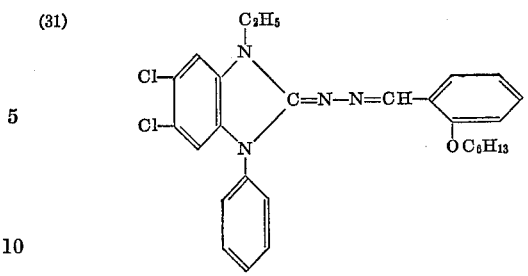

5,6-dichloro-1-ethyl-3-phenyl-2-N-benzimidazolo-6′-
hexyloxy-benzalazine

(32) 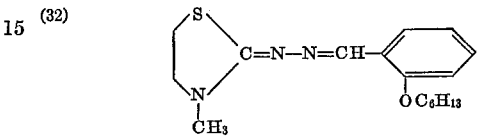

6-hexyloxybenzal-3′-methyl-2′-N-thiazoloazine

(33) 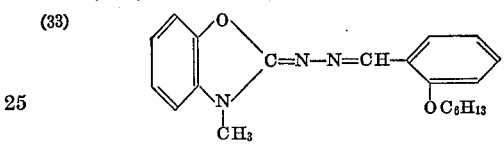

6-hexyloxybenzal-3′-methyl-2′-N-benzoxazoloazine

The compounds of Formula I may be prepared by reacting a hydrazone of the formula:

(III) 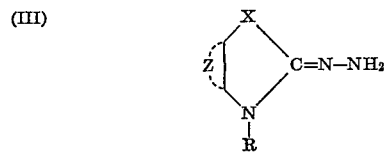

with a ketone or aldehyde of the formula:

(IV) 

As examples of hydrazones of Formula III, mention may be made of:

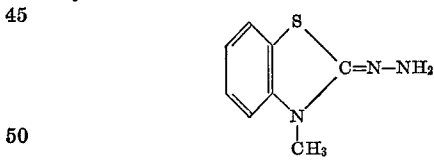

3-methyl - 2 - benzothiazolone hydrazone; 2-α-naphthothiazolone hydrazone; 2-β-naphthotiazolone hydrazone; 3-ethyl - 2 - benzoxazolone hydrazone; 5-phenyl-3-(3-sulfopropyl) benzozazolone hydrazone; 3-(2-carboxyethyl)-2-benzoselenazolone hydrazone; 5-methoxy - 3 - methyl-2-benzoxazolone hydrazone; 5-chloro-3-(4-sulfobutyl)-2-benzothiazolone hydrazone; 1,3-diethyl-2-benzimidazolone hydrazone; 5,6-dichloro - 1 - ethyl-3-phenyl-2-benzimidazolone; 3-methyl - 2 - thiazolone hydrazone; 3-methyl-2-benoxazolone hydrazone; 3-ethyl-2-selenazolone hydrazone; 3-ethyl-2-benzoxazolone hydrazone; and the like.

As examples of ketones and aldehydes of Formula IV, mention may be made of: benzaldehyde; o-methoxybenzaldehyde; m-methoxybenzaldehyde; p-methoxybenzaldehyde; o-hexyloxybenzaldehyde; p-N,N-dimethylaminobenzaldehyde; m-nitrobenzaldehyde; p-nitrobenzaldehyde; p-hydroxybenzaldehyde; 3,4-dimethoxybenzaldehyde; 2,3-dimethoxybenzaldehyde; 2,4-dimethoxybenzaldehyde; 2,5-dimethoxybenzaldehyde; 3,4,5-trimethoxybenzaldehyde; p-cyanobenzaldehyde; p-carboxybenzaldehyde; p-chlorobenzaldehyde; p-trimethylammoniumbenzaldehyde tosylate; 1-naphthaldehyde; acetophenone; benzophenone; m-hydroxybenzaldehyde; p-tolualdehyde; salicylaldehyde; 4′-methylacetophenone; 4′-aminoacetophenone; 4′-bromoacetophenone; 4'-chloroacetophenone; n-butyrophenone; 4'-methoxyacetophenone; 3'-nitroacetophenone; 1'-hydroxy-2'-acetophenone; 2'-acetonaphthone; 4'-hydroxyacetophenone; 2'-hydroxyacetophenone; 2',4',6'-trimethylacetophenone; 3'-aminoacetophenone; iso-butyrophenone; 4'-ethylacetophenone; 4'-nitroacetophenone; 4'-chloropropionphenone; 2',4'-dimethylacetophenone; 3',4'-dichloroacetophenone; and the like.

The hydrazones of Formula III may be prepared by reacting (V)
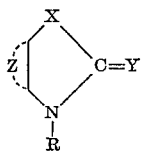

wherein Y is oxygen or sulphur; with (VI) $NH_2$—$NH_2$

The preferred compounds of Formula I, identified by Formula II, may be prepared by reacting a hydrazone of the formula:

(VII)
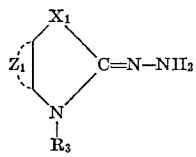

with an aldehyde of the formula:

(VIII) $R_4CHO$

The invention will be illustrated in greater detail in conjunction with the following specific examples which set out representative synthetic processes particularly adapted for the preparation of the novel compounds of this invention which, however, are not limited to the details therein set forth and are intended to be illustrative only.

EXAMPLE 2.2 gm. (0.01 mole) of 3-methyl-2-benzothiazolone hydrazone and 0.84 gm. (0.01 mole) of sodium acetate were dissolved in 100 cc. of ethanol. 2.5 gm. (0.012 mole) of o-hexyloxybenzaldehyde dissolved in 10 cc. of ethanol was added to the solution. 2 cc. of glacial acetic acid was then added to the solution. After several hours, the product, 2-hexyloxybenzal-3'-methyl-2'-N-benzothiazoloazine, M.P. 92° C., was removed from the solution by filtration and recrystallized from ethanol.

*Analysis.*—Calculated: C, 64.6; H, 5.05; N, 14.1; S, 10.8. Found: C, 64.5; H, 51.5; N, 13.9; S, 10.8.

$\lambda_{max.}^{ethanol}$ 357; $\epsilon$ 31,200; $\lambda_{sec.}$ 362; $\epsilon_{sec.}$ 29,400

The procedure of the preceding example was then repeated employing as the aldehyde reactant: benzaldehyde to provide 3-methyl-2-N-benzothiazolobenzalazine, Formula 22, M.P. 167° C., $\lambda_{max.}$ 352, $\epsilon$ 28,800; o-methoxybenzaldehyde to provide 2-methoxybenzal-3'-methyl-2'-N-benzothiazoloazine, Formula 2, M.P. 165° C., $\lambda_{max.}$ 357, $\epsilon$ 30,200; m-methoxybenzaldehyde to provide 3-methoxybenzal - 3' - methyl - 2' - N-benzothiazoloazine, Formula 3, M.P. 84° C., $\lambda_{max.}$ 351, $\epsilon$ 22,200; p-methoxybenzaldehyde to provide 4-methoxybenzal-3'-methyl-2'-N-benzothiazoloazine, Formula 4, M.P. 143° C., $\lambda_{max.}$ 349, $\epsilon$ 34,000; p-N,N-dimethylaminobenzaldehyde to provide 4-N,N-dimethylaminobenzal-3'-methyl-2'-N'-benzothiazoloazine, Formula 5, M.P. 175° C., $\lambda_{max.}$ 366, $\epsilon$ 48,800; m-nitrobenzaldehyde to provide 3-methyl-2-N-benzothiazolo-3'-nitrobenzolazine, Formula 6, M.P. 206° C., $\lambda_{max.}$ 362, $\epsilon$ 25,400; p-nitrobenzaldehyde to provide 3-methyl-2-N-benzothiazolo-4'-nitrobenzalazine, Formula 7, M.P. 222° C., $\lambda_{max.}$ 415, $\epsilon$ 20,000; 3,4-dimethoxybenzaldehyde to provide 3,4-dimethoxybenzal-3'-methyl-2'-N-benzothiazoloazine, Formula 9, M.P. 132° C., $\lambda_{max.}$ 351, $\epsilon$ 37,200, $\lambda_{sec.}$ 365, $\epsilon_{sec.}$ 30,400; 2,5-dimethoxybenzaldehyde to provide 2,5-dimethoxybenzal - 3' - methyl-2'-N-benzothiazoloazine, Formula 11, M.P. 145° C., $\lambda_{max.}$ 367, $\epsilon$ 31,200; 1-naphthaldehyde to provide 3-methyl-2-N-benzothiazolonaphthalazine, Formula 10, M.P. 165° C., $\lambda_{max.}$ 368, $\epsilon$ 18,200; m-hydroxybenzaldehyde to provide 3-hydroxybenzal - 3' - methyl-2'-N-benzothiazoloazine, Formula 12, $\lambda_{max.}$ 348, $\epsilon$ 16,200; p-hydroxybenzaldehyde to provide 4-hydroxybenzal-3'-methyl-2'-N-benzothiazoloazine, Formula 8, M.P. 254° C., $\lambda_{max.}$ 363, $\epsilon$ 23,200, $\lambda_{sec.}$ 349, $\epsilon_{sec.}$ 29,600; p-tolualdehyde to provide 4-methylbenzal-3'-methyl-2'-N-benzothiazoloazine, Formula 14, M.P. 142° C., $\lambda_{max.}$ 350, $\epsilon$ 25,600; salicylaldehyde to provide 2-hydroxybenzal-3'-methyl-2'-N-benzothiazoloazine, Formula 13, M.P. 114° C., $\lambda_{max.}$ 371, $\epsilon$ 26,600, $\lambda_{sec.}$ 357, $\epsilon_{sec.}$ 30,800; 3,4,5-trimethoxybenzaldehyde to provide 3,4,5-trimethoxybenzal - 3' - methyl-2'-N-benzothiazoloazine, Formula 18, M.P. 278° C., $\lambda_{max.}$ 362, $\epsilon$ 24,000; 4-2,3-dimethoxybenzaldehyde to provide 2,3-dimethoxybenzal-3'-methyl-2'-N-benzothiazoloazine, Formula 16, M.P. 96° C., $\lambda_{max.}$ 353, $\epsilon$ 24,800; 2,4-dimethoxybenzaldehyde to provide 2,4-dimethoxybenzal - 3' - methyl-2'-N-benzothiazoloazine, Formula 15, M.P. 128° C., $\lambda_{max.}$ 360, $\epsilon$ 34,400; 4-cyanobenzaldehyde to provide 4-cyanobenzal-3'-methyl-2'-N-benzothiazoloazine, Formula 17, M.P. 203° C., $\lambda_{max.}$ 386, $\epsilon$ 29,600; 4-carboxybenzaldehyde to provide 4-carboxybenzal - 3 ' -methyl-2'-N-benzothiazoloazine, Formula 18, M.P. 278° C., $\lambda_{max.}$ 362, $\epsilon$ 24,000; 4-chlorobenzaldehyde to provide 4-chlorobenzal-3'-methyl-2'-N-benzothiazoloazine, Formula 19, M.P. 176° C., $\lambda_{max.}$ 358, $\epsilon$ 29,200; 4-trimethylammoniumbenzaldehyde p-tosylate to provide 4-(trimethylammonium p-tosylate)-benzal-3'-methyl-2'-N-benzothiazoloazine, Formula 20, M.P. 248 C., $\lambda_{max.}$ 370, $\epsilon$ 26,200; acetophenone to provide 3-methyl - 2 - N-benzothiazolo-α-methylbenzalazine, Formula 21, M.P. 103° C., $\lambda_{max.}$ 346, $\epsilon$ 24,800; benzophenone to provide 3-methyl-2'-N-benzothiazolo-α-phenylbenzalazine, Formula 22, M.P. 153° C., $\lambda_{max.}$ 360, $\epsilon$ 26,600.

The compounds of the invention are particularly adapted for employment as spectral radiation filtering agents. They find specific application as the radiation filtering agents employed in the photographic art as constitutent components of photographic film unit filter layers formulated in accordance with techniques well known to the art, as illustrated by reference, for example, to U.S. Patents Nos. 3,094,418; 3,050,393; 3,022,171; 3,002,837; 2,968,557; 2,904,433; 2,860,979; 2,843,486; 2,750,291; and the like.

The preferred compounds of Formula II are particularly desirable ultra-violet absorbing compounds adapted for photographic filter layer employment in accordance with techniques well known to the art, see, for example, U.S. Patents Nos. 2,888,346; 2,875,053; 2,784,087; 2,685,512; and the like.

Since certain changes may be made in the above product and process without departing from the scope of the invention herein involved, it is intended that all matter contained in the above description shall be interpreted as illustrative and not in a limiting sense.

What is claimed is:

1. A compound of the formula:

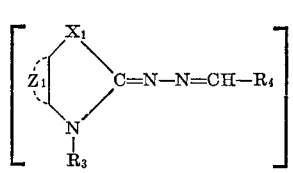

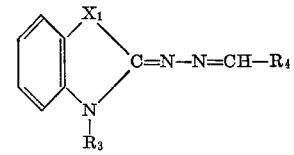

wherein:
X₁ is selected from the group consisting of sulfur and selenium;
R₃ is an alkyl group containing from 1 to 5 carbon atoms; and
R₄ is an aryl group selected from the group consisting of mono-, bis- and tri-lower alkoxyphenyl and naphthyl groups.

2.
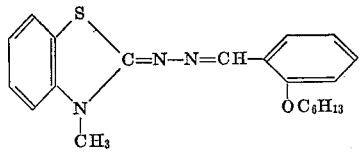

3.
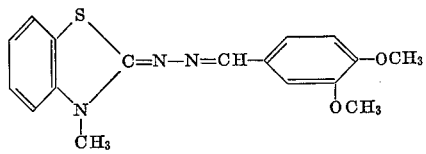

4.
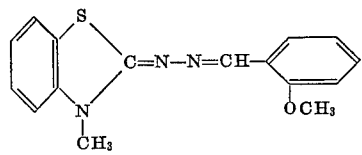

5.
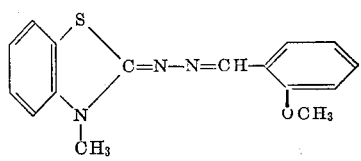

6.
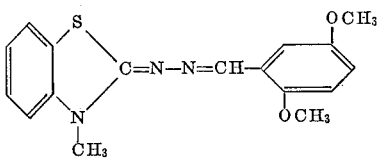

References Cited
UNITED STATES PATENTS
3,076,721  2/1963  Coles et al.

FOREIGN PATENTS
1,353,497  1/1964  France.
880,653  10/1961  Great Britain.

OTHER REFERENCES
Hunig et al.: Ann. der Chemie, vol. 609, pp. 172–80 (1957) QD127.

JOHN D. RANDOLPH, *Primary Examiner.*

H. I. MOATZ, *Assistant Examiner.*

U.S. Cl. X.R.

260—299, 309.2, 307, 240.9, 305; 96—84